United States Patent [19]
Jahn

[11] Patent Number: 5,579,892
[45] Date of Patent: Dec. 3, 1996

[54] APPARATUS FOR THE COUNTING, COLLECTION AND TRANSPORTATION OF SAUSAGE CASINGS AND PROCESS

[75] Inventor: Jakob Jahn, Wiesbaden, Germany

[73] Assignee: Hoechst Aktiengesellschaft, Frankfurt, Germany

[21] Appl. No.: 377,345

[22] Filed: Jan. 24, 1995

[30] Foreign Application Priority Data

Feb. 2, 1994 [DE] Germany ........................... 44 03 056.8

[51] Int. Cl.$^6$ .................................................. B65G 47/26
[52] U.S. Cl. .................... 198/419.3; 198/832.1; 198/836.3; 198/958
[58] Field of Search .................... 198/418, 419.1, 198/419.2, 419.3, 832.1, 836.1, 836.3, 958

[56] References Cited

U.S. PATENT DOCUMENTS

| | | | |
|---|---|---|---|
| 3,292,505 | 12/1966 | Wiseman | 198/419.3 |
| 3,395,784 | 8/1968 | Kanarek | 198/419.2 |
| 3,530,972 | 9/1970 | Erekson | 198/419.3 |
| 3,938,650 | 2/1976 | Holt | 198/419.3 |
| 4,233,709 | 11/1980 | Smith et al. | |
| 5,101,957 | 4/1992 | Schiek | 198/419.1 |
| 5,265,400 | 11/1993 | Roberts et al. | 198/419.3 X |

FOREIGN PATENT DOCUMENTS

| | | |
|---|---|---|
| 0092970 | 11/1983 | European Pat. Off. . |
| 0498483 | 8/1992 | European Pat. Off. . |
| 2263180 | 10/1975 | France . |
| 3021260 | 12/1980 | Germany . |
| 3916109 | 6/1990 | Germany . |
| 486377 | 2/1970 | Switzerland . |

*Primary Examiner*—D. Glenn Dayoan
*Attorney, Agent, or Firm*—Foley & Lardner

[57] ABSTRACT

An apparatus 1 for counting, collecting and transporting sausage casings is equipped with collecting rails 3, 4, initiators 6, 12, a lever 5, a counter 7 and a rotating collecting chain 10 with drivers 11, 14, 24. The sausage casings 15 are counted by way of the lever 5, a first initiator 6 and counter 7, and are pushed into the gap between the collecting rails 3, 4 and stored there. After a preselectable number of sausage casings has been counted, the counter 7 sets the collecting chain 10 and sausage casings in motion, until the collecting chain 10 is disengaged by an electromagnetic coupling via the further driver 24 and a second initiator 12. At increased working speeds of the tying-off machine, the number of preselected sausage casings is likewise increased correspondingly, so that, even in the case of an unchanged collecting chain speed, the number of articles supplied to the gap can be transported away.

12 Claims, 3 Drawing Sheets

APPARATUS FOR THE COUNTING, COLLECTION AND TRANSPORTATION OF SAUSAGE CASINGS AND PROCESS

BACKGROUND OF THE INVENTION

1. Field of the Invention

The invention relates to a sausage casing apparatus. In particular, the present invention relates to an apparatus for the counting, collection and transportation of sausage casings which are supplied to the apparatus by an ejector on a tying-off machine.

2. Description of Related Art

An apparatus of the type described above is known from a commercially available synthetic-casing tying-off machine of Messrs. VEB Kombinat Nagema, Dresden. It essentially comprises a delivery chain which rotates in an endlessly closed manner around two rollers, one of which drives or actuates the delivery chain. The apparatus works in that a tied-off sausage casing coming from the machine is pushed by an ejector onto the delivery chain. After a permanently set number of five ejection operations, the delivery chain starts up and transports the accumulated five sausage casings over a specific distance at a constant, invariable speed. The conveyor chain then stops until the next five sausage casings have accumulated.

The sausage casings are removed from the delivery chain by the operating personnel, checked for damage, if necessary bundled into larger units, and delivered for further processing.

A disadvantage of an apparatus of this type is that the working speed of the tying-off machine cannot be increased, without operating or processing errors occurring on the delivery chain, since the mode of operation of the latter cannot be adjusted to match the working speed of the tying-off machine. In other words, the delivery chain can transport only a permanently set number of sausage casings per unit time.

SUMMARY OF THE INVENTION

One object of the present invention is to provide an apparatus which overcomes the deficiencies of the known apparatus. Another object of the present invention is to provide a sausage casing tying-off apparatus which has higher working speeds than the known apparatus. Still another object of the present invention is to provide an adjustable apparatus that is capable of effectively handling a variable number of articles. Yet another object of the present invention is to provide an improved process for counting, collecting and transporting articles, preferably sausage casings.

In accomplishing the foregoing objects, there has been provided according to one aspect of the present invention, an apparatus for counting, collecting and transporting sausage casings supplied to the apparatus by an ejector of a tying-off machine. The apparatus comprises, a transport unit and a control unit. The transport unit is activated by the control unit when said ejector has supplied a preselected number of sausage casings to the transport unit, and wherein the control unit deactivates said transport unit after the sausage casings have been transported over a specific distance.

In another aspect of the present invention there has been provided a process for counting, collecting and transporting sausage casings. The process comprises individually supplying sausage casings to a gap formed between collecting rails of a counting, collecting and transporting apparatus; counting each individual sausage casing supplied to said collecting rails; transporting the sausage casings supplied to the collecting rails further into said gap, after a preselected number of sausage casings have been counted; and terminating the transporting after said sausage casings have been transported a predetermined distance.

Further objects, features and advantages of the present invention will become apparent from the detailed description of preferred embodiments which follows.

DETAILED DESCRIPTION OF THE PREFERRED EMBODIMENTS

Figure 1:
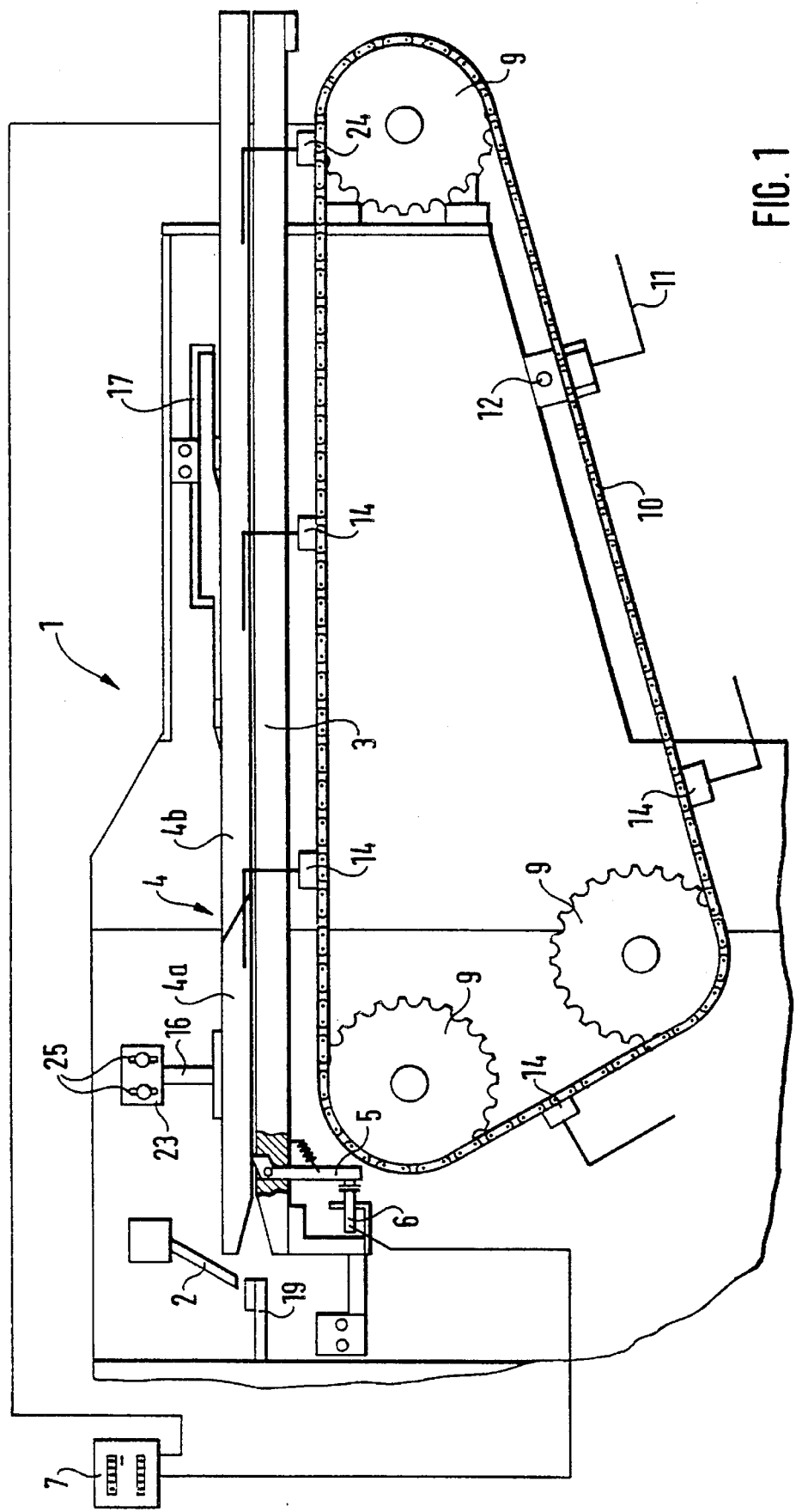
FIG. 1 shows a diagrammatic side view of a first embodiment of the present invention.

The present invention comprises an apparatus which has a transport unit and a control unit. The transport unit is activated by the control unit as soon as an ejector has supplied a specific preselected number of sausage casings to the transport unit. The control unit then switches off the transport unit after the sausage casings have been transported over a specific distance.

In a preferred embodiment of the present invention, the transport unit includes chain wheels, a collecting chain with drivers attached thereto, an electromagnetic coupling, a drive and collecting rails. The collecting rails form a gap, through which the sausage casings run. The collecting chain rotates in an endlessly closed manner via the chain wheels, one of which can be actuated or driven by a motor via the electromagnetic coupling, a drive chain and a gear.

The control unit of the apparatus is defined in that the control unit comprises at least one counter, a lever and initiators. The lever is preferably arranged near an entry orifice defined by the collecting rails. The lever can be actuated by each sausage casing, which causes the lever to come into contact with a first initiator which transmits a counting pulse (i.e., signal) to the counter electrically connected to the first initiator. The counter is electrically connected to the electromagnetic coupling which activates the collecting chain after a preselected number of sausage casings or counting pulses (signals) at the counter has been reached.

A second initiator is electrically connected to the electromagnetic coupling. The electromagnetic coupling can be cut out (i.e., deactivated) as soon as a driver mounted on the collecting chain passes the second initiator which sends a corresponding cut-out pulse or signal to the electromagnetic coupling.

The front part of the collecting rail is preferably arranged near the ejector and can be adjusted in height and fixed in position by means of an adjusting screw displaceable in a long hole (i.e., elongated slot) of a block. In contrast to this, the rear part of the collecting rail is held movably by a resilient fastening element similar to a stirrup. This allows the rear part be matched to sausage casings of different thicknesses and protects the casings from damage. Within the scope of the present invention, a preselected number of sausage casings is introduced into the gap of the collecting rails and stored. With this arrangement, sufficient time remains for the operating personnel to remove the accumulated sausage casings and transfer them, even with increased working speeds of the tying-off machine.

In a preferred embodiment, there are preferably two or more counters which can each be set at a different number of counting pulses, so that, in the individual work cycles of the collecting chain, a different number of sausage casings is correspondingly accumulated and transported further. Each counter preferably includes a microprocessor. The sausage casings are transported by the drivers which are mounted on the rotating collecting chain, the collecting chain being capable of being moved past, below and along the lower collecting rail.

The possibility of counting the sausage casings and of activating the transport unit in an adjustable manner affords great flexibility in the choice of the working speed of the tying-off machine.

Another aspect of the present invention provides automatic resetting of the counter. This feature makes the work of the operating personnel easier.

The features of the apparatus of the present invention described above, improve the efficiency of the tying-off machine.

Two exemplary embodiments of the invention are described in more detail below with reference to FIGS. 1, 2 and 3.

The initial situation for a work cycle of a collecting chain 10 of an apparatus 1 is such that one of the drivers 11, 14, 24 fastened to the collecting chain 10 has approached an initiator 12. A work cycle subsequently proceeds as follows.

Figure 2:
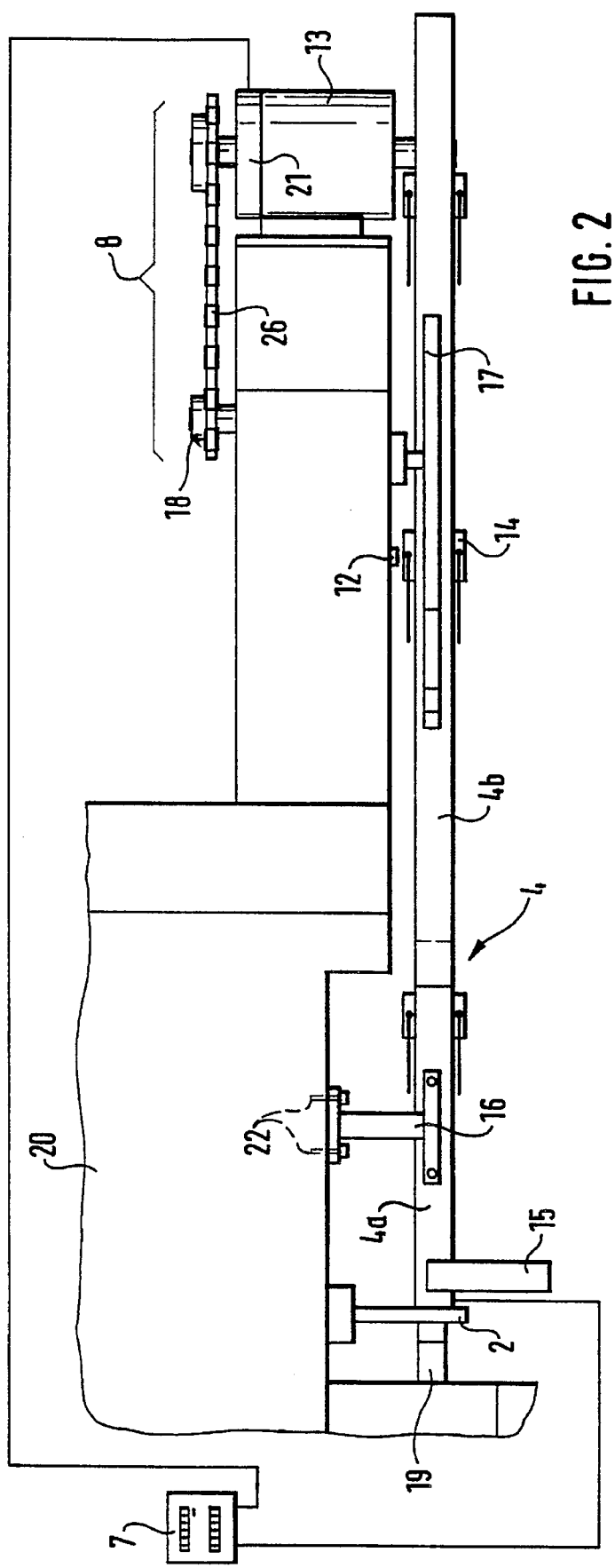
FIG. 2 shows a top view of the embodiment according to FIG. 1.

With reference to FIGS. 1 and 2, prefabricated tied-off sausage casing 15 is pushed out of a clip 19 by an ejector 2 into the gap between an upper collecting rail 4 and a lower collecting rail 3. The ejector 2 is an integral part of a tying-off machine 20 for the sausage casings which is not shown or described in any more detail.

During this movement of the sausage casing, a movable lever 5, which is arranged underneath the lower collecting rail 3, is pressed. The lever 5 transmits to a counter 7, via an initiator 6, a pulse or signal which appears on the display of the counter 7. Sausage casings are pushed into the gap until a preselected number of articles which has been set on the counter 7 is reached. When this preselected number is reached, an electromagnetic coupling 21 is switched on by a pulse or signal from the counter 7.

The electromagnetic coupling 21 directly couples a motor 13, which is continuously running, via a drive chain 26 of a drive unit 8 with its shaft to a chain wheel 9 which in turn is engaged with the collecting chain 10 and which thus sets in motion the drivers 11, 14, 24 fastened to the collecting chain 10. These drivers transport the accumulated sausage casings in the gap between the upper and lower collecting rails 4 and 3 until the driver 24 located downstream of the driver 11 has reached a further initiator 12. At this point, the electromagnetic coupling 21 is disengaged or cut out by means of a pulse from the initiator 12. The collecting chain together with the drivers 11, 14, 24 stops. A work cycle of the apparatus 1 is completed and is thus terminated.

No standstill or downtime caused by the mode of operation of the apparatus 1, occurs on the tying-off machine 20 during the work flow, since the counter 7 works with automatic resetting. In other words, after the set number of articles has been reached, the counter is automatically reset to zero again. The preselected number of counting pulses is thus maintained or stored in the counter, so that a new counting operation can be initiated without any standstill or interruption of the apparatus.

The upper collecting rail 4 is designed in two parts, so that no sausage casings are damaged during the transport of the sausage casings in the gap between the upper and lower collecting rail 3.

The first part 4a is arranged near the ejector 2 and is held by a holding element 16. As required, the first part 4a can be fixed at different heights via adjusting screws 22 which are movable in long holes (i.e., elongated slots) 25 of a block 23 of the holding element 16.

The second part 4b adjoins the first directly and is movably held by means of a resilient fastening element 17. The upper collecting rail 4 therefore can be matched to sausage casings 15 of different thicknesses to protect them from damage.

The lower collecting rail 3 is designed in one part and is mounted in a fixed position.

Figure 3:
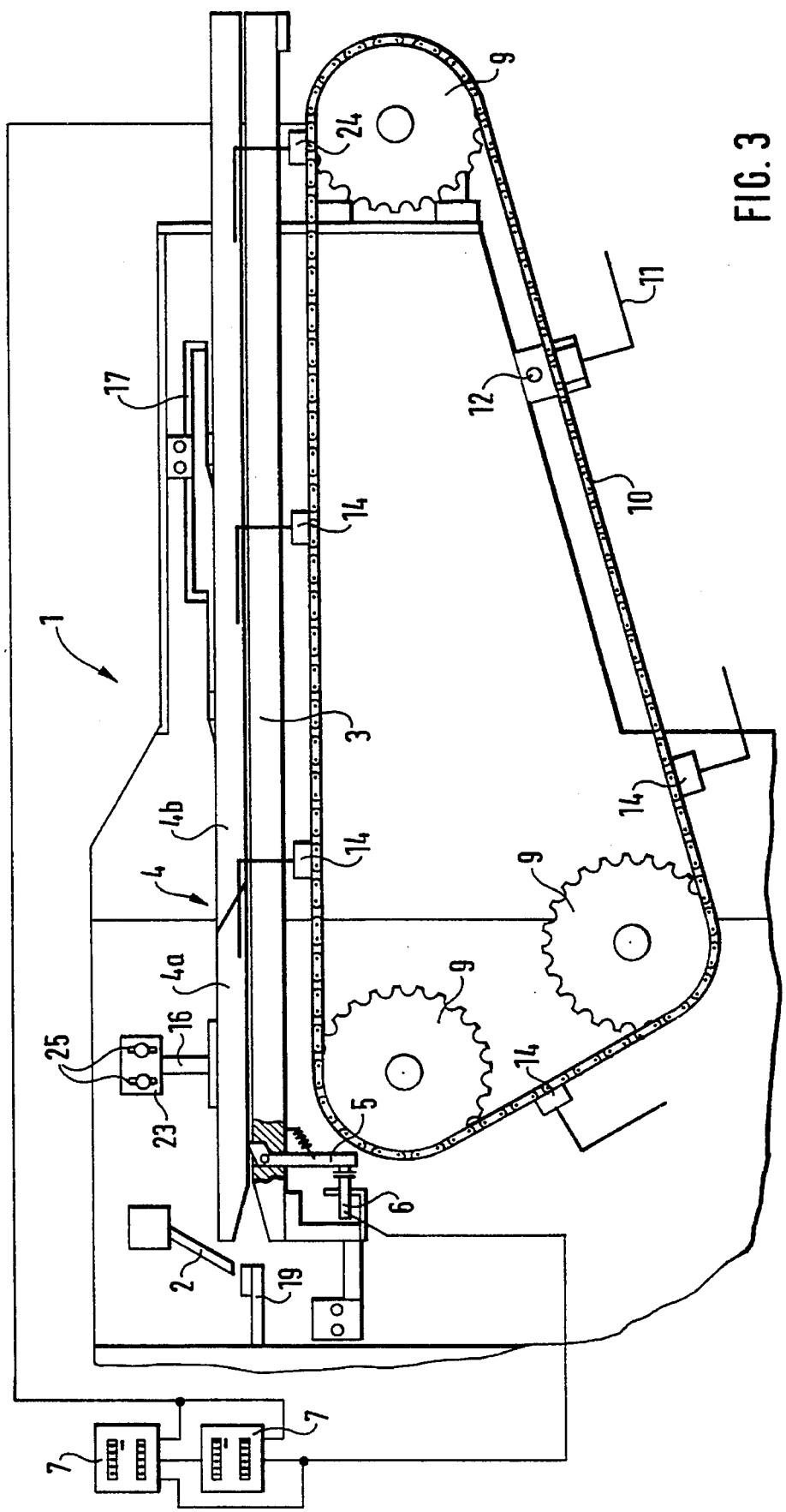
FIG. 3 shows a diagrammatic side view of a second embodiment of the present invention.

FIG. 3 shows a diagrammatic side view of a further embodiment of the present invention which differs from the version illustrated in FIG. 1 in that there are two counters 7. Both are electrically connected to the initiator 6 and the electromagnetic coupling 21. In addition, there is also an electrical connection between the two counters 7, by which the two counters are in communication and can switch one another on and off.

This embodiment makes it possible to accumulate different quantities of sausage casings in two successive work cycles. This is achieved by setting each counter for a different number of sausage casings. After the set number is reached in the activated or running counter, the running counter switches on the other stationary or inactive counter via an electrical pulse. The activated counter cuts itself out after automatic resetting described above has occurred.

Additional different quantities of sausage casings 15 can be assigned to the work cycles of the collecting chain 10 by means of additional counters 7 in a similar way.

Each individual counter 7 of the present invention preferably contains, for example, a programmable microprocessor which stores the preselected number of counting pulses and compares this number with the number of counted pulses. The microprocessor then transmits a switch-on pulse to the electromagnetic coupling as soon as the number of counted pulses coincides with the preselected number of counting pulses. If more than one counter is used, the microprocessor of the counter can also transmit a pulse to another counter.

The present invention also provides for a process of counting and transporting further a preselected number of sausage casings.

This process includes the counting, collection and transportation of sausage casings between collecting rails of an apparatus. The sausage casings supplied to the collecting rails are counted individually, in that, when a preselected number of sausage casings has been reached, the casings are transported further in the gap between the collecting rails. The transport of the sausage casings is stopped after a predetermined distance has been covered.

In a preferred embodiment, each sausage casing supplied from the tying-off machine triggers an electrical pulse from an initiator. The pulse is transmitted to a counter which, after a preselected number of pulses has been reached, switches on an electromagnetic coupling for operating a collecting chain. When a driver mounted on the collecting chain runs past a further initiator, an electrical pulse cutting out the electromagnetic coupling is triggered. Thus, one cycle of the process is completed.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. An apparatus for counting, collecting and transporting sausage casings supplied to said apparatus by an ejector of a tying-off machine, said apparatus comprising;
    a transport unit which includes upper and lower collecting rails positioned to form a gap therebetween through which the sausage casings run,
        a collecting chain having drivers mounted thereon and adapted for engaging said sausage casings present in said gap,
        a plurality of chain wheels, wherein said collecting chain rotates in an endlessly closed manner around said chain wheels and
        a drive for driving said collecting chain, said drive including a motor, a gear in communication with one of said plurality of chain wheels, a drive chain coupled to said motor and gear, and an electromagnetic coupling for engaging and disengaging said motor from said collecting chain; and
    a control unit, wherein said transport unit is activated by said control unit when said ejector has supplied a preselected number of sausage casings to said transport unit, and wherein said control unit deactivates said transport unit after the sausage casings have been transported over a predetermined distance.

2. An apparatus as claimed in claim 1, wherein said collecting chain is positioned below and along the lower collecting rail, whereby said collecting chain can be moved past, below and along the lower collecting rail.

3. An apparatus as claimed in claim 1, wherein the control unit comprises:
    at least one counter electrically connected to said electromagnetic coupling;
    a lever positioned near an entry orifice of the gap; and
    a first initiator arranged in communication with said lever and electrically connected to said at least one counter, wherein said lever is actuated by a sausage casing and said lever comes into contact with said first initiator, said first initiator transmits a counting pulse to said at least one counter in response to said lever, and wherein said at least one counter sends a pulse to said electromagnetic coupling to engage said collecting chain via said drive chain, gear and motor after a preselected number of counting pulses from said first initiator has been received by said at least one counter.

4. An apparatus as claimed in claim 3, further comprising a second initiator positioned in proximity to said collecting chain and electrically connected to said electromagnetic coupling, wherein said second initiator transmits a pulse to disengage said electromagnetic coupling from said collecting chain, when one of said drivers passes said second initiator.

5. An apparatus as claimed in claim 3, wherein said at least one counter comprises at least two counters and wherein each of said at least two counters can be set to receive a different number of counting pulses from said first initiator before transmitting a pulse to said electromagnetic coupling, whereby different work cycles can be performed to accumulate and transport a different number of sausage casings.

6. An apparatus as claimed in claim 3, wherein said at least one counter includes a microprocessor.

7. An apparatus as claimed in claim 5, wherein each of said at least two counters has automatic resetting means to reset each of said at least two counters back to zero after a preselected number of counting pulses from said first initiator has been received by each of said at least two counters, and wherein each of said at least two counters are electrically connected to at least one other of said at least two counters and each of said at least two counters can be switched on and off by electrical pulses received from said one other of said at least two counters.

8. An apparatus as claimed in claim 1, wherein said lower collecting rail is one piece and arranged in a fixed position, and wherein said upper collecting rail comprises a front part which is vertically adjustable by adjusting means, and a rear part which is resiliently mounted to said apparatus.

9. An apparatus as claimed in claim 8, wherein said front part of said upper collecting rail is arranged near the ejector and said vertical adjusting means comprises adjusting screws and a block with elongated slots arranged in proximity to said front part, and wherein said adjusting screws are displaceable in said elongated slots and said adjusting screws retain and support said front part of said upper collecting rail.

10. An apparatus as claimed in claim 8, wherein said rear part of said upper collecting rail is mounted to said apparatus by a resilient fastening element.

11. A process for counting, collecting and transporting sausage casings, said process comprising the steps of:
    individually supplying sausage casings to a gap formed between collecting rails of a counting, collecting and transporting apparatus;
    counting each individual sausage casing supplied to said collecting rails;
    transporting the sausage casings supplied to said collecting rails further into said gap, after a preselected number of sausage casings have been counted; and
    terminating the transporting after said sausage casings have been transported a predetermined distance.

12. A process as claimed in claim 11, wherein the individually supplying step includes the step of activating an electrical pulse in a first initiator, which pulse is transmitted to a counter; then
    after a preselected number of pulses has been transmitted to said counter, activating an electromagnetic coupling which engages a motor to start a collecting chain having at least one driver mounted thereon; and
    when said driver passes a second initiator, transmitting an electrical pulse to said electromagnetic coupling thereby disengaging said coupling from said collecting chain.

* * * * *